(12) United States Patent
Nitta

(10) Patent No.: US 9,776,435 B2
(45) Date of Patent: Oct. 3, 2017

(54) ELASTIC ROLLER

(71) Applicant: SATO HOLDINGS KABUSHIKI KAISHA, Tokyo (JP)

(72) Inventor: Haruhiko Nitta, Hyogo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/313,210

(22) PCT Filed: May 8, 2015

(86) PCT No.: PCT/JP2015/063257
§ 371 (c)(1),
(2) Date: Nov. 22, 2016

(87) PCT Pub. No.: WO2015/182343
PCT Pub. Date: Dec. 3, 2015

(65) Prior Publication Data
US 2017/0182802 A1    Jun. 29, 2017

(30) Foreign Application Priority Data

May 27, 2014    (JP) ................................. 2014-109448

(51) Int. Cl.
*B41J 11/057* (2006.01)
*B41J 3/407* (2006.01)
(Continued)

(52) U.S. Cl.
CPC ........... *B41J 11/057* (2013.01); *B41J 3/4075* (2013.01); *B65C 9/30* (2013.01); *B65H 27/00* (2013.01); *F16C 13/00* (2013.01)

(58) Field of Classification Search
CPC ......... B41J 11/057; B41J 3/4075; B65C 9/30; B65H 27/00; F16C 13/00
See application file for complete search history.

(56) References Cited

U.S. PATENT DOCUMENTS 5,779,370 A    7/1998 Schroeder et al.
8,379,071 B2   2/2013 Katayama
(Continued)

FOREIGN PATENT DOCUMENTS

JP    60-130648 A    7/1985
JP    6-001510 A     1/1994
(Continued)

*Primary Examiner* — Lamson Nguyen
(74) *Attorney, Agent, or Firm* — Foley & Lardner LLP

(57) ABSTRACT

An elastic roller includes: a roller shaft; and an elastic member. The elastic roller includes an inner layer side elastic member, and a coating layer. The inner layer side elastic member has a rubber hardness of 30 to 80 degrees that is measured by a durometer type A in accordance with the standard of JIS K 6253. The inner layer side elastic member has a tear strength of 25 N/mm or more that is measured using an unnicked angle-shaped test piece in accordance with JIS K 6252. The coating layer is made of silicone resin, and has a thickness of 10 to 100 μm. The silicone resin has hardness of 20 degrees or less that is measured using a spring-based Asker C type in accordance with SRIS 0101 standard. The inner layer side elastic member has a plurality of internal grooves along a circumferential direction. Each of the internal grooves has a width of 25 to 1,300 μm, and has a depth of 25 to 500 μm. Each of the internal grooves has a V-shaped in cross section and has a groove angle of 50 to 120 degrees.

20 Claims, 3 Drawing Sheets

(51) Int. Cl.
 *B65C 9/30* (2006.01)
 *F16C 13/00* (2006.01)
 *B65H 27/00* (2006.01)

(56) References Cited

U.S. PATENT DOCUMENTS 9,376,539 B2 * 6/2016 Takano ................... F16C 13/00
2004/0163558 A1 8/2004 Itoh et al.

FOREIGN PATENT DOCUMENTS

| | | |
|---|---|---|
| JP | 2000-505012 A | 4/2000 |
| JP | 2002-116608 A | 4/2002 |
| JP | 2004-277172 A | 10/2004 |
| JP | 2009-286616 A | 12/2009 |
| JP | 2011-031426 A | 2/2011 |
| JP | 2013-049146 A | 3/2013 |
| JP | 2014-087988 A | 5/2014 |

\* cited by examiner

ELASTIC ROLLER

TECHNICAL FIELD

The present invention relates to elastic rollers.

BACKGROUND ART

Conventionally a linerless label has been developed. The linerless label does not include a sheet to be separated (a so-called liner). The sheet is temporarily attached to the rear face of an adhesive layer of the label. Such a linerless label is expected to be a resource-saving material because it does not have a liner that will be discarded after use (see Laid open patent publication JP 2011-31426 A, for example).

FIG. 5 is a perspective view of a conventional linerless label 1 that is wound into a roll. As shown in FIG. 5, this linerless label 1 includes a label base 2, an adhesive layer 3 on the rear-face side, a thermosensitive color developing layer 4 on the front-face side, and a transparent separation agent layer 5 on the top of these layers.

The label base 2 has a location detection mark 6 preprinted on the rear face.

The label base 2 may have fixed information (not illustrated) preprinted on the surface as needed. The fixed information may be a mark indicating the label user, the name, and/or other designs.

This linerless label 1 may be separated into a single label piece 1A by cutting it at cutting lines 7 at predetermined intervals.

FIG. 6 is a schematic side view of a conventional thermal printer 8. The thermal printer 8 has a function of printing variable information on the linerless label 1. Variable information may be information on a commodity information, such as the price and a barcode, or management information on goods or services, for example. The thermal printer 8 includes a feed part 9, a guide part 10, a detection part 11, a print part 12, and a cutting part 13.

The feed part 9 is configured to hold a roll-shaped linerless label 1 and to release the linerless label 1 in a belt-shaped toward the guide part 10, the detection part 11, the print part 12 and the cutting part 13.

The guide part 10 includes a guide roller 14. Such a guide part 10 is configured to guide the released linerless label 1 toward the detection part 11 and the print part 12.

The detection part 11 includes a location detection sensor 15. The detection part 11 is configured to detect a location detection mark 6 on the rear face of the linerless label 1 so as to detect the location of the linerless label 1 (label piece 1A) relative to the print part 12.

The print part 12 includes a thermal head 16 and a platen roller 17. The print part 12 is configured to pinch the linerless label 1 between the thermal head and the platen roller with a predetermined print pressure. The print part 12 is configured to rotary-drive the platen roller 17 at a fixed speed. The print part 12 is configured to supply print data to the thermal head 16 to let the thermosensitive color developing layer 4 develop colors. In this way, the print part 12 can print predetermined variable information on the linerless label 1 (label piece 1A).

The cutting part 13 includes a fixed blade 18 and a movable blade 19. The cutting part 13 is configured to cut the printed linerless label 1 at a part corresponding to the cutting lines 7 at predetermined intervals when the linerless label 1 is transferred between these blades, and to eject the label pieces 1A.

In the thermal printer 8 having such a configuration, the platen roller 17 to transfer the linerless label 1 for printing is a roller made of an elastic body such as rubber member, for example. In order to avoid sticking of the adhesive of the adhesive layer 3 to the roller, such a roller may be made of a silicone rubber member having non-stick property or a rubber member impregnated with silicone oil. Silicone oil may be applied to the peripheral surface of the platen roller 17 for this purpose.

SUMMARY OF THE INVENTION

Technical Problem

For a long-term use, however, it is difficult to completely prevent the sticking of the adhesive. When such sticking occurs, the linerless label 1 passing through the platen roller 17 may stick to the platen roller 17 and may be caught in there (see the virtual line in FIG. 6). This causes a paper jam, which will be an obstacle to the normal transferring and printing of the linerless label 1 and ejection of label pieces 1A.

If the printer stops printing and ejection while leaving the linerless label 1 pinched between the thermal head 16 and the platen roller 17, then it will be hard to separate the linerless label 1 from the surface of the platen roller 17. In such a case as well, the linerless label 1 will be easily caught in the platen roller similarly to the above.

This leads to the necessity of repeatedly performed maintenance operations (e.g., cleaning of the peripheral surface of the platen roller 17, or replacing the platen roller 17 with a new one). Therefore, there is a demand for an elastic roller enabling stable transferring and printing for a long time.

In some configurations of the printer, an elastic roller for labels having excellent non-stick property or separation property (release property) is required for rollers other than the platen roller 17 as well. They include a nip roller unit (not illustrated) including a pair of rollers that is rotary-driven to transfer the linerless label 1 and a roller configured to simply guide the linerless label 1 as in the guide roller 14.

There is a demand for an elastic roller configured to stably transfer the linerless label 1 and a label with a liner when any one of them is loaded. That is, an elastic roller that can be used for transferring both of the linerless label and the label with a liner also is demanded.

In order to avoid sticking of the adhesive layer 3, grooves are formed on the outer surface of the platen roller 17, for example, in a trial basis so as to reduce the contact area with the linerless label 1 (with the adhesive layer 3). However, when a typical label with a liner is transferred and printed using such a platen roller with grooves, a necessary frictional force (gripping force) cannot be obtained with the liner of the label because of the insufficient contact area with the rear face of the liner. This often causes a problem about the transferring function, such as slipping of the label, and stable transferring and printing cannot be expected.

Such grooves or the like formed in the platen roller 17 lead to easy wear of the platen roller 17 as well.

Similarly to the linerless label 1 as stated above, these problems may occur also when transferring or guiding a belt-shaped member made of paper or film having an adhesive layer or a bonding layer on the rear face or an adhesive product such as adhesive tape. Therefore, an elastic roller having excellent non-stick property or separation property (release property) is required.

The present invention aims to provide an elastic roller having excellent non-stick property or separation property (release property) and offering a necessary frictional force (gripping force) with a belt-shaped member.

Solution to Problem

An elastic roller according to one aspect of the present invention, comprises: a roller shaft; and an elastic member attached around the roller shaft, the elastic roller configured to transfer a belt-shaped member while the belt-shaped member is in contact with the elastic member. The elastic member includes: an inner layer side elastic member disposed around the roller shaft; and a coating layer disposed around the inner layer side elastic member, the coating layer for being in contact with the belt-shaped member. The inner layer side elastic member has a rubber hardness of 30 to 80 degrees, the rubber hardness being measured by a durometer type A in accordance with the standard of JIS K 6253. The inner layer side elastic member has a tear strength of 25 N/mm or more, the a tear strength being measured using an unnicked angle-shaped test piece in accordance with JIS K 6252. The coating layer is made of silicone resin, and has a thickness of 10 to 100 μm. The silicone resin has hardness of 20 degrees or less, the hardness being measured using a spring-based Asker C type in accordance with SRIS 0101 standard. The inner layer side elastic member has a plurality of internal grooves along a circumferential direction. Each of the internal grooves has a width of 25 to 1,300 μm. Each of the internal grooves has a depth of 25 to 500 μm. Each of the internal grooves has a V-shaped in cross section and has a groove angle of 50 to 120 degrees.

The silicone resin may comprise a thermosetting silicone resin.

The inner layer side elastic member may comprise a thermoplastic elastic material or a thermosetting elastic material.

The coating layer may have a plurality of coating layer grooves along a circumferential direction.

The inner layer side elastic member may have an inner layer platform-shaped apex part between neighboring internal grooves.

The coating layer may have a flat coating layer platform-shaped apex part between neighboring coating layer grooves.

The internal grooves may desirably have a pitch of 500 to 1,500 μm.

The elastic roller may have a constant diameter in a plane orthogonal to an axial direction of the roller shaft.

The elastic roller may have a diameter in a plane orthogonal to an axial direction of the roller shaft, the diameter gradually decreasing from a center part of the roller shaft toward both ends of the roller shaft along the axial direction of the roller shaft.

The elastic roller may have a diameter in a plane orthogonal to an axial direction of the roller shaft, the diameter of a first end of the roller shaft in the axial direction thereof being different from that of a second end in the axial direction of the roller shaft in the axial direction thereof.

The inner layer side elastic member desirably has a tear strength of 27 to 45 N/mm.

Advantageous Effects

The present invention can provide an elastic roller having excellent non-stick property or separation property (release property) and offering a necessary frictional force (gripping force) with a belt-shaped member.

DESCRIPTION OF EMBODIMENTS (First Embodiment)

Figure 1:
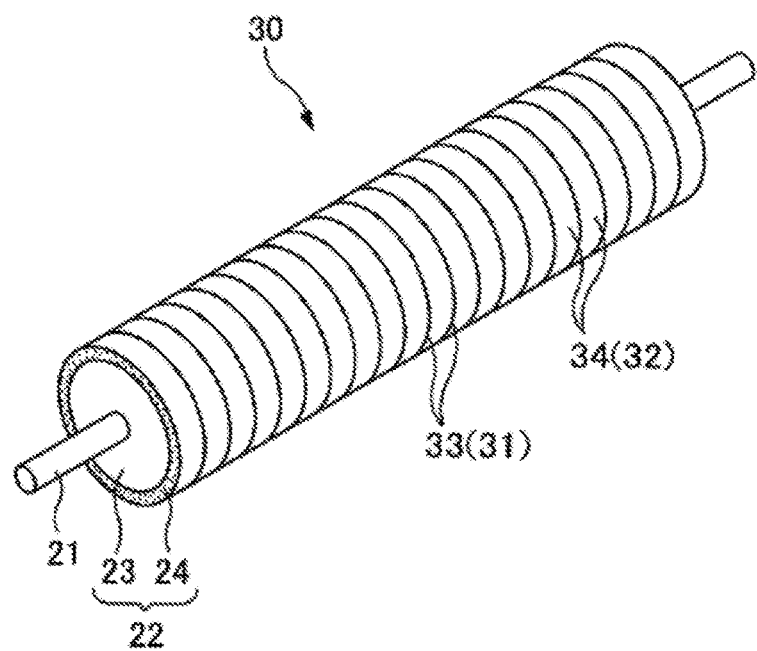
FIG. 1 is a perspective view of a platen roller 30 of a first embodiment.
Figure 2:
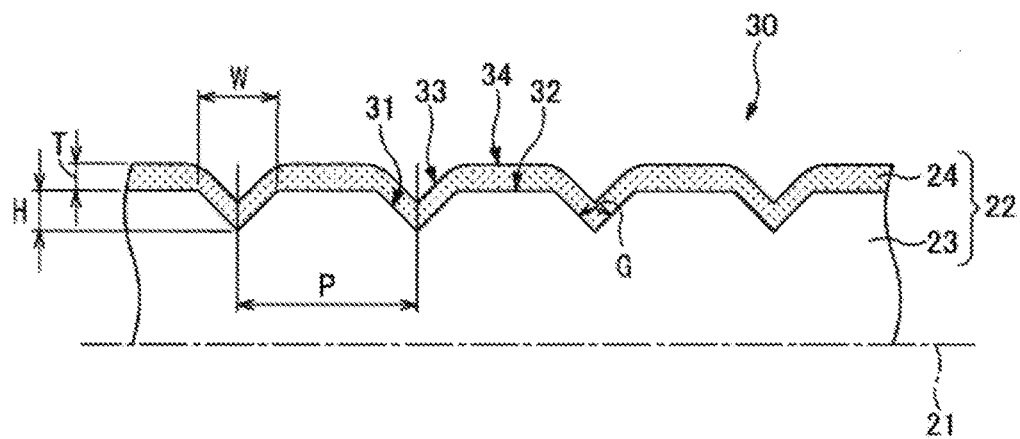
FIG. 2 is an enlarged cross-sectional view of a major part of the platen roller 30 in FIG. 1 along the axial direction.
Figure 5:
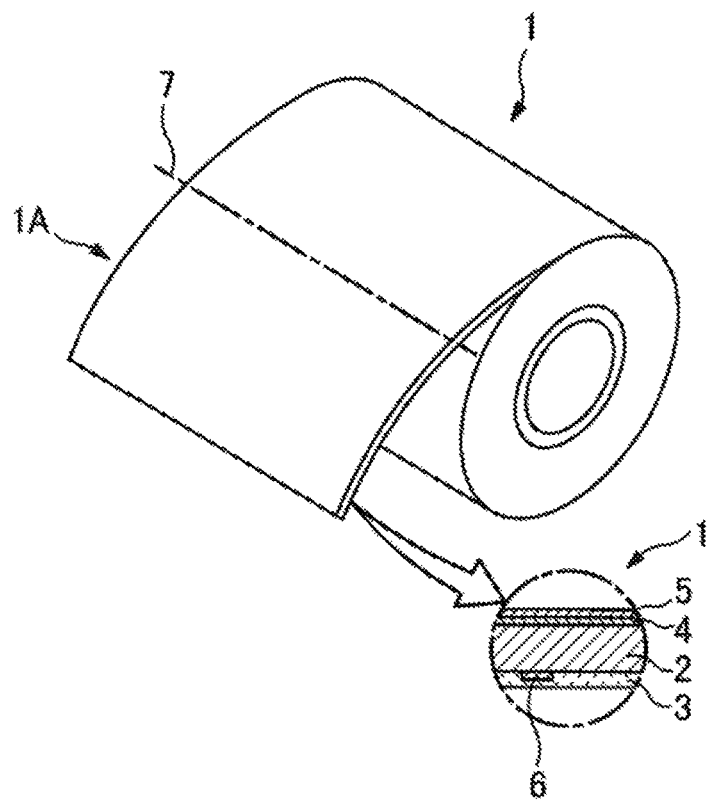
FIG. 5 is a perspective view of a conventional linerless label 1 that is wound into a roll.
Figure 6:
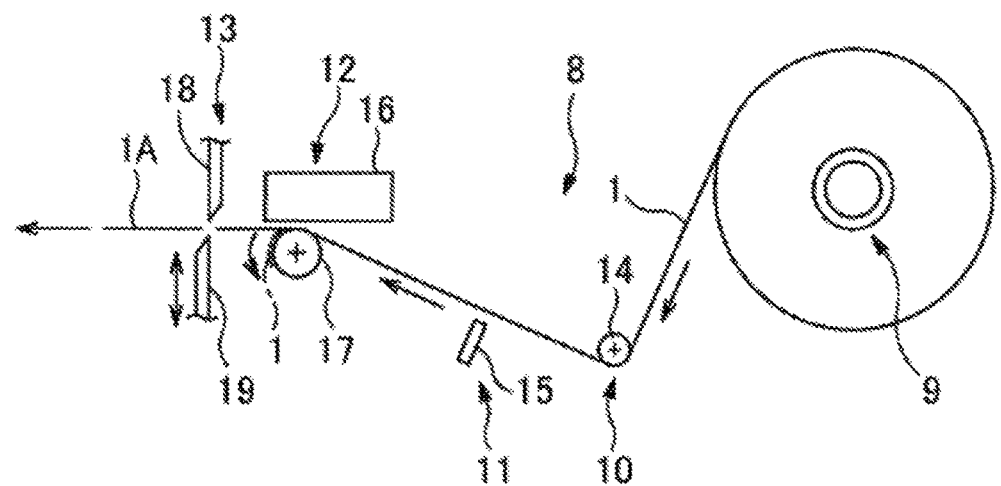
FIG. 6 is a schematic side view of a conventional thermal printer 8.

Referring to FIGS. 1 and 2, the following describes an elastic roller of a first embodiment in the case that a platen roller 30 (elastic roller for labels) in the thermal printer 8 is similarly to the platen roller 17 (FIG. 6). Like numbers indicate like components in FIGS. 5 and 6, and their detailed descriptions are omitted.

FIG. 1 is a perspective view of the platen roller 30 of a first embodiment. FIG. 2 is an enlarged cross-sectional view of a major part of the platen roller 30 in FIG. 1 along the axial direction. As shown in FIGS. 1 and 2, the platen roller 30 includes a roller shaft 21, and an elastic member 22. The elastic member 22 is mounted around the roller shaft 21 and is rotatable integrally with the roller shaft. The platen roller 30 is configured to transfer a label (e.g., the linerless label 1 in FIG. 5) while the elastic member 22 is in contact with the label.

The elastic member 22 includes an inner layer side elastic member 23 that is round-pillar shaped and disposed around the roller shaft 21, and a coating layer 24 (external elastic member) that is disposed integrally with and around the inner layer side elastic member 23. The coating layer 24 is in contact with the linerless label 1. The platen roller 30 has grooves formed on the surface thereof.

Materials of these members are described. The inner layer side elastic member 23 is made of a thermoplastic elastic material or a thermosetting elastic material.

Examples of synthetic resins making up the inner layer side elastic member include polyethylene, polypropylene, polymethylpentene, polybutene, crystalline polybutadiene, polybutadiene, styrene-butadiene resin, polyvinyl chloride, polyvinyl acetate, polyvinylidene chloride, ethylene-vinyl acetate copolymer, ethylene-propylene copolymer, ethylene-propylene-diene copolymer, ionomer, polymethylmethacrylate, polytetrafluoroethylene, ethylene-polytetrafluoroethylene copolymer, polyacetal(polyoxymethylene), polyamide, polycarbonate, polyphenylene ether, polyethylene terephthalate, polybutylene terephthalate, polyarylate, polystyrene, polyethersulfone, polyimide, polyamide-imide, polyphenylene sulfide, polyoxybenzoyl, polyether ether ketone, polyetherimide, polystyrene, polyurethane, polyester, 1,2-polybutadiene, phenol resin, urea resin, melamine resin, benzoguanamine resin, diallyl phthalate resin, alkyd resin, epoxy resin, and silicon resin.

Other examples that can be used include thermosetting elastic materials, such as thermosetting silicone rubber, one-component RTV (Room Temperature Vulcanizing) rubber, two-component RTV rubber, LTV (Low Temperature Vulcanizable) silicone rubber, and oil-resistant thermosetting rubber. In particular, millable type silicone rubber is preferable.

The inner layer side elastic member 23 has hardness of 30 to 80 degrees. The hardness is measured by a durometer type A in accordance with the standard of JIS K 6253, and hereinafter this is called "JIS-A hardness".

If JIS-A hardness is less than 30 degrees, such a platen roller 30 is too soft to transfer and guide a belt-shaped member such as the linerless label 1. That is, the platen roller 30 has a problem about the transferring function because of excessive frictional force when contact is made. Print quality of the thermal printer 8 (FIG. 6) also deteriorates.

If JIS-A hardness exceeds 80 degrees, such a platen roller 30 is too hard. The transferring force and the transferring accuracy of the platen roller 30 deteriorate because of a small gripping force.

JIS-A hardness is the standard corresponding to ISO-7619-1 and ASTM D 2240.

All of the contents of JIS K 6253 standard, ISO-7619-1 standard and ASTM D 2240 standard are incorporated herein by reference.

The inner layer side elastic member 23 has a tear strength of 25 N/mm or more by the tearing test in accordance with JIS K 6252. This tearing test is performed using an unnicked angle-shaped test piece. If the tear strength is less than 25 N/mm, sufficient durability cannot be obtained. Although larger tear strength is desirable, if merely tear strength is increased, other physical properties, such as hardness and stretch, may be degraded. The upper limit of the tear strength is limited to about 50 N/mm. Considering a good balance of the properties, the tear strength of 27 to 45 N/mm is desirable.

The tearing test in accordance with JIS K 6252 (tearing test using an unnicked angle-shaped test piece) is the standard corresponding to ISO 34-1 and ISO 34-2.

All of the contents of JIS K 6252 standard, ISO 34-1 standard and ISO 34-2 standard are incorporated herein by reference.

The coating layer 24 is made of a thermosetting silicone resin or other silicone resins having JIS-C hardness of 20 degrees or less. JIS-C hardness is measured using a spring-based Asker C type in accordance with SRIS 0101 standard.

Examples of the silicone resin include silicone resin called silicone gel, RTV (Room Temperature Vulcanizing) liquid silicone rubber, LTV (Low Temperature Vulcanizable) liquid silicone rubber, ultraviolet cure liquid silicone rubber, and thermosetting liquid silicone rubber.

Silicone resins inherently have non-stick property or separation property. Therefore, when the linerless label 1 is pressed to and transferred using a roller made of silicone resin, the adhesive layer 3 of the linerless label 1 does not stick to the silicone resin.

A thermosetting silicone resins are relatively easy to adjust the thermosetting conditions, process and set JIS-C hardness.

If JIS-C hardness is 20 degrees or less, such a silicone resin is a gel that is appropriately soft. It has a frictional force (gripping force) required with a belt-shaped member such as the linerless label 1 or a label with a liner, and resists wear well.

Therefore, the platen roller 30 made of the resin has a separation property and a gripping force required with a belt-shaped member such as the linerless label 1 or a label with a liner, and can exert stable transferring and guiding functions.

If JIS-C hardness exceeds 20 degrees, elasticity of the coating layer 24 is close to the elasticity of a rubber member. Then adhesiveness of the coating layer 24 on the surface increases rapidly, and the layer wears down easily.

The hardness (JIS-C hardness) measured using a spring-based Asker C type in accordance with SRIS 0101 standard is globally used as a de fact standard to measure low degree of hardness, and is equivalent to JIS K 7312.

All of the contents of SRIS 0101 standard and JIS K 7312 standard are incorporated herein by reference.

The coating layer 24 has a thickness T (FIG. 2) of 10 to 100 μm.

If thickness T is less than 10 μm, the coating layer 24 has non-uniformity in thickness. Therefore, it is difficult to have stable separation property and gripping force.

If thickness T exceeds 100 μm, the layer is brittle as the coating film of the inner layer side elastic member 23 in the platen roller 30, and is easily torn.

Referring next to FIGS. 1 and 2, the following describes grooves on the surface of the platen roller 30. The platen roller 30 has a plurality of internal grooves 31 having a V-shaped in cross section along a circumferential direction of the inner layer side elastic member 23 (made of thermosetting silicone rubber having JIS-A hardness of 50 degrees). More precisely, the cross section is taken along in the plane including the center line of the platen roller 30. The platen roller 30 has the coating layer 24 made of a thermosetting silicone resin having JIS-C hardness of 15 degrees. The coating layer 24 is formed around the inner layer side elastic member 23 with the internal grooves 31.

The inner layer side elastic member 23 has an inner layer platform-shaped apex part 32 between the neighboring internal grooves 31.

The coating layer 24 formed around the inner layer side elastic member 23 has a plurality of coating layer grooves 33 at the positions of the internal grooves 31. The coating layer grooves 33 are along a circumferential direction of the coating layer 24. Each coating layer groove 33 has a substantially V-shaped in cross section (see FIG. 2).

The coating layer 24 has a flat coating layer platform-shaped apex part 34 between the neighboring coating layer grooves 33.

The internal grooves 31 and the coating layer grooves 33 may have shapes in cross section other than a V-shaped, such as a U-letter shape, a truncated conical shape, a rectangular shape and other polygonal shapes.

The internal grooves 31 have a pitch P of 500 to 1,500 μm.

If the pitch P of the internal grooves 31 is less than 500 μm, there is little space for processing the inner layer platform-shaped apex part 32 between mutually neighboring internal grooves 31.

If the pitch P of the internal grooves 31 exceeds 1,500 μm, it tends to decrease the ratio of the internal grooves 31 or the coating layer grooves 33 to a whole of the platen roller 30, and to increase the contact area with a belt-shaped member such as the linerless label 1. This may lead to a reduction in separation property of the platen roller 30.

The internal grooves 31 has a width W of 25 to 1,300 μm, preferably 50 to 500 μm.

If the width W of the internal grooves 31 is less than 25 μm, the contact area with a belt-shaped member such as the linerless label 1 increases. It tends to reduce separation property of the platen roller 30.

If the width W of the internal grooves 31 exceeds 1,300 μm, pressure at a part of the platen roller 30 to appropriately press and support the linerless label 1 on the side of the adhesive layer 3 decreases. Then missing part to be printed on the label piece 1A tends to occur at the print part 12 of the thermal printer 8, that is, print accuracy deteriorates.

The internal grooves 31 have a depth H of 25 to 500 μm, preferably 50 to 400 μm.

If the depth H of the internal grooves 31 is less than 25 μm, the contact area with a belt-shaped member such as the linerless label 1 increases. It tends to reduce separation property of the platen roller 30.

If the depth H of the internal grooves 31 exceeds 500 μm, pressure at a part of the platen roller 30 to press and support the linerless label 1 on the side of the adhesive layer 3 decreases. Then missing part to be printed on the label piece 1A tends to occur at the print part 12 of the thermal printer 8, that is, print accuracy deteriorates.

The internal grooves 31 have a groove angle G of 50 to 120 degrees, preferably 60 to 100 degrees.

If the groove angle G of the internal grooves 31 is less than 50 degrees, the contact area with a belt-shaped member such as the linerless label 1 increases. It tends to reduce separation property of the platen roller 30.

If the groove angle G of the internal grooves 31 exceeds 120 degrees, pressure at a part of the platen roller 30 to press and support the linerless label 1 on the side of the adhesive layer 3 decreases. Then missing part to be printed on the label piece 1A tends to occur at the print part 12 of the thermal printer 8, that is, print accuracy deteriorates.

The following describes a rolling angle test to evaluate non-stick property (separation property) of the elastic roller of the present embodiment.

The linerless label 1 of FIG. 5 is fixed on a flat and even base plate so that the adhesive layer 3 is directed upward. For adhesive as the reference in the test, an emulsion adhesive having strong adhesiveness is used. The adhesive has a thickness of 20 μm.

The platen roller 30 to be tested is placed on the adhesive layer 3. Then a weight of 2 Kg in weight is placed thereon to apply the weight to the platen roller for 15 seconds to make the platen roller 30 stick to the linerless label 1.

After 15 seconds, the weight is removed, and the base plate is inclined by gradually raising one end of the base plate that is parallel to the axial line of the platen roller 30 while fixing the other end of the base plate.

When the platen roller 30 starts to roll downward, the raising of the base plate is stopped. Then, the inclination angle of the base plate at this time is measured. Such an inclination angle is the rolling angle.

A platen roller 30 having a smaller inclination angle (rolling angle) and rolling easily has high non-stick property. Such platen roller 30 is suitable to transfer the linerless label 1.

An experiment by the present inventor showed that there are no problems in the actual operation as rollers such as the platen roller 17 in the thermal printer 8 (FIG. 6) or a nip roller if an elastic roller has this rolling angle of 30 degrees or less, preferably 15 degrees or less after transferring the linerless label 1 for the distance of 20 Km (Kilometers).

An experiment to transfer the linerless label 1 and a label with a liner was performed using the thus configured platen roller 30.

For a first embodiment, a platen roller 30 was prepared, including the inner layer side elastic member 23 made of silicone rubber having JIS-A hardness of 50 degrees and the tear strength of 36 N/mm. The coating layer 24 around the inner layer side elastic member had a thickness T of 50 μM, and was made of thermosetting silicone rubber (silicone gel) having JIS-C hardness of 15 degrees. The internal grooves 31 had the pitch P of 750 μm, the width W of 410 μm, the depth H of 350 μm and the groove angle G of 60 degrees.

For comparison, a platen roller (comparative roller) including an elastic member only made of silicone rubber having JIS-A hardness of 45 degrees and the tear strength less than 25 N/mm was prepared. This platen roller had the internal grooves 31 only having similar dimensions as those stated above, but did not have the coating layer 24. The experiment was performed to transfer the linerless label 1 and a label with a liner using this platen roller.

After transferring the linerless label 1 for 20 Km using the platen roller 30 of this embodiment, the rolling angle of the platen roller 30 was measured by the method as stated above. The measurement was less than 13 degrees. Similarly, the rolling angle measured after normally transferring the label with a liner for 20 Km was less than 9 degrees. From both of the measurements, the platen roller as the elastic roller was sufficient in separation property to transfer the linerless label and in gripping force to transfer the label with a liner.

After transferring the linerless label 1 for 20 Km, the wear proceeding rate of the platen roller 30 was 0.05% or less. After transferring a label with a liner for 50 Km, the wear proceeding rate of the platen roller 30 was 0.5% or less. It was found that the platen roller 30 had sufficient wear resistance. Synergistic effect was confirmed such that durability such as wear resistance was obtained using silicone rubber having JIS-A hardness of 50 degrees and the tear strength of 36 N/mm as the inner layer side elastic member 23 and separation property was obtained using a thermosetting silicone resin (silicone gel) having JIS-C hardness of 15 degrees as the coating layer 24 formed around the inner layer side elastic member.

The linerless label 1 was transferred using the platen roller as the comparative roller. The comparative roller was made of silicone rubber only having JIS-A hardness of 45 degrees and the tear strength less than 25 N/mm and did not have the coating layer 24. Transferring was performed normally immediately after the starting of the transferring test due to separation property of the silicone rubber itself. However, after transferring for 0.5 Km, the linerless label 1 was wound around the comparative roller. When the rolling angle of the platen roller as the comparative roller at this time was measured, the platen roller still stuck to the adhesive layer even where the base plate of the tester was inclined by 70 degrees. It was found that this platen roller was unusable for long-distance transferring. When a label with a liner was transferred, slip occurred and transferring for a specified distance failed. In this way, it was found that this platen roller did not have a sufficient gripping force.

Further, another platen roller 30 was prepared, using the same materials as those of a first embodiment, but the width W and the depth H of the internal grooves 31 were changed. Then, the experiment to transfer the linerless label 1 and a label with a liner was performed.

A coating layer 24 was formed around the inner layer side elastic member 23. The coating layer 24 was made of a thermosetting silicone resin (silicone gel) having the thickness T of 50 μm and JIS-C hardness of 15 degrees. The internal grooves 31 had the pitch P of 750 μm, the width W of 87 μm, the depth H of 75 μm, and the groove angle G of 60 degrees.

A platen roller (comparative roller) including the internal grooves 31 only having the same dimensions as stated above, but not including the coating layer 24 was prepared. The experiment was performed to transfer the linerless label 1 and a label with a liner using this platen roller.

After transferring the linerless label 1 using the platen roller 30 having the narrow width W and the shallow depth H of the internal grooves 31 for 20 Km, the rolling angle of the platen roller was measured by the method as stated above. The measurement was less than 18 degrees. Similarly, after transferring a label with a liner for 20 Km, the measurement was less than 9 degrees. From both of the measurements, it was found that the platen roller had sufficient separation property to transfer a linerless label and gripping force to transfer a label with a liner as the elastic roller.

After transferring the linerless label 1 for 20 Km, the wear proceeding rate of the platen roller 30 was 0.05% or less. After transferring a label with a liner for 50 Km, the wear proceeding rate of the platen roller 30 was 0.5% or less. It was found that the platen roller 30 had sufficient wear resistance.

The linerless label 1 was transferred similarly for 1 Km using the platen roller (comparative roller) not including the coating layer 24 and including the internal grooves 31 only having the pitch P of 750 μm, the width W of 87 μm, the depth H of 75 μm, and the groove angle G of 60 degrees. After that, the rolling angle test was performed. The platen roller still stuck to the adhesive layer even when the base plate of the tester was inclined by 70 degrees. It was found that this platen roller did not have a separation property necessary for use. When a label with a liner was transferred, slip occurred and transferring for a specified distance failed. In this way, it was found that this platen roller did not have a sufficient gripping force.

A platen roller 30 (elastic roller) having the internal grooves 31 in the inner layer side elastic member 23 as well as having the coating layer grooves 33 in the coating layer 24 showed both of a separation property and a gripping force required to transfer a linerless label and a label with a liner.

(Second Embodiment)

Figure 3:
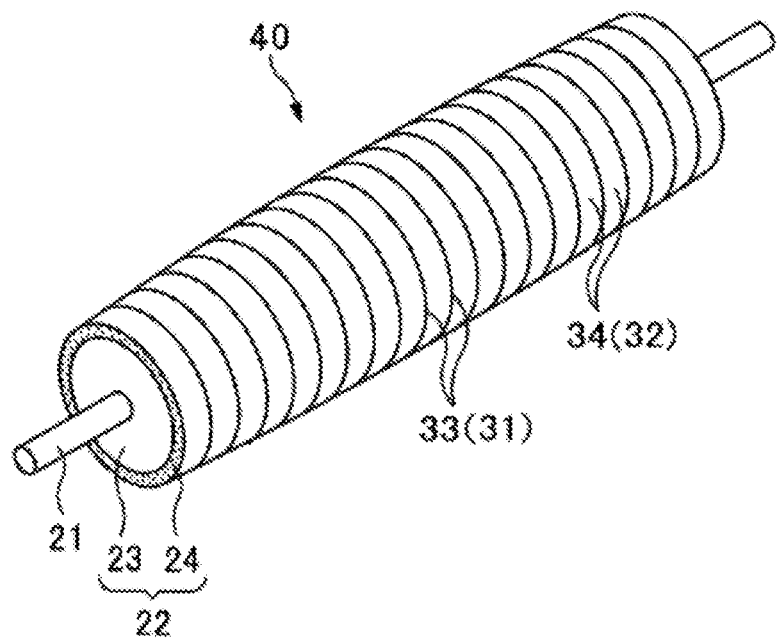
FIG. 3 is a perspective view of a platen roller 40 of a second embodiment.

FIG. 3 is a perspective view of a platen roller 40 of a second embodiment. As shown in FIG. 3, the platen roller 40 has a diameter in the plane orthogonal to the axial direction of the roller shaft 21 that gradually decreases from a center part to both ends along the axial direction of the roller shaft 21. That is, this platen roller 40 has a shape such that a center part of the platen roller 30 of a first embodiment protrudes. Other than a so-called barrel-shape, this platen roller includes the inner layer side elastic member 23 and the coating layer 24 making up the elastic member 22 that are made of the same materials as those of a first embodiment. The internal grooves 31, the coating layer grooves 33, the inner layer platform-shaped apex part 32 and the coating layer platform-shaped apex part 34 are also the same as those of a first embodiment. The difference in diameter between the center part and both ends of the platen roller 40 is 10 to 250 μm.

This platen roller 40 is effective for transferring a label having a width narrower than the width of the print part 12 of the thermal printer 8 (the widths of the thermal head 16 and the platen roller 17) and printing thereon. For instance, the effective printing width of a 4-inch printer is 104 mm. If a label (either a linerless label or a label with a liner) of 40 mm in width is set at the center of the print part 12 of this printer for transferring and printing, the platen roller 17 and the thermal head 16 rub against directly at a part not pinching the label therebetween. This causes an increase in load or wear at this part. When the platen roller 40 having a protruding center part is used for this purpose, a contact between both ends of the platen roller 40 and the thermal head 16 is reduced or they are not in contact. Therefore, transferring and printing are more stable, and the life of the platen roller 40 can be lengthened.

(Third Embodiment)

Figure 4:
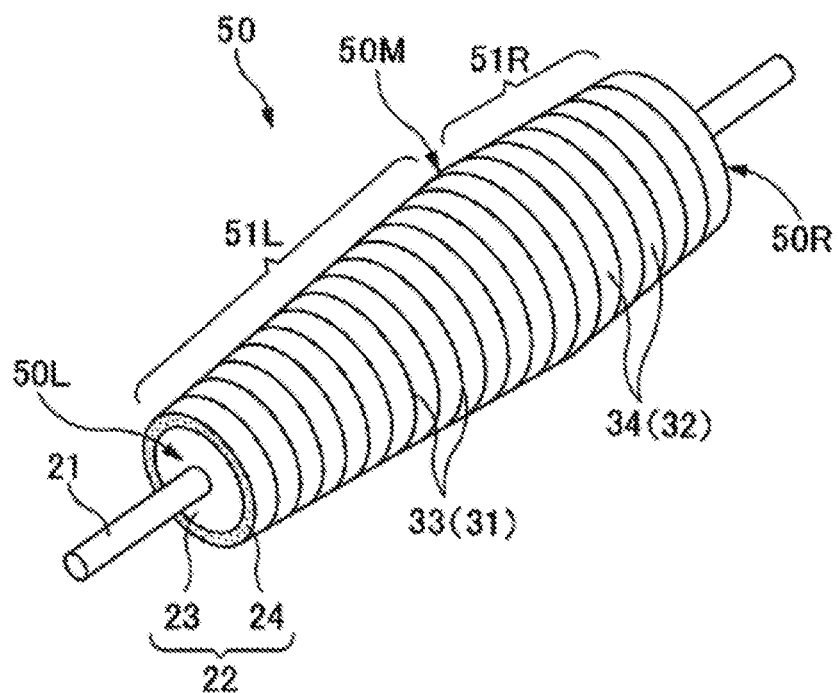
FIG. 4 is a perspective view of a platen roller 50 of a third embodiment.

FIG. 4 is a perspective view of a platen roller 50 of a third embodiment. As shown in FIG. 4, the platen roller 50 has a diameter in the plane orthogonal to the axial direction of the roller shaft 21 that is not constant but is different between the diameter of a first end 50L and that of a second end 50R in the axial direction thereof. In FIG. 4, the platen roller 50 has a maximum diameter part 50M at a part close to the second end 50R relative to the center part. The platen roller 50 has a shape such that a thick part is placed to one side. Other than such a shape that a thick part is placed to one side, this platen roller includes the inner layer side elastic member 23 and the coating layer 24 making up the elastic member 22 that are made of the same materials as those of a first embodiment. The internal grooves 31, the coating layer grooves 33, the inner layer platform-shaped apex part 32 and the coating layer platform-shaped apex part 34 are also the same as those of a first embodiment. The difference in diameter between the maximum diameter part 50M and the first end 50L having the minimum diameter is 10 to 250 μm.

This platen roller 50 is effective for transferring a label having a width narrower than the width of the print part 12 of the thermal printer 8 (the widths of the thermal head 16 and the platen roller 17) while positioning the label on one side of the print part 12 and printing thereon. For instance, the effective printing width of a 4-inch printer is 104 mm. A label (either a linerless label or a label with a liner) of 40 mm in width is positioned on one side of the print part 12 of this printer for transferring and printing. Then the label is pinched between a second peripheral face 51R including the maximum diameter part 50M and the thermal head, and so can be transferred and printed stably. On the contrary, a first peripheral face 51L of the platen roller does not pinch the label, at which the platen roller 17 and the thermal head 16 rubs against directly. This platen roller 50 can reduce a contact between the first peripheral face 51L of the platen roller 50 and the thermal head 16 or they are not in contact. Therefore, transferring and printing are more stable, and the life of the platen roller 50 can be lengthened.

In FIG. 4, the platen roller 50 has a maximum diameter part 50M at a part close to the second end 50R relative to the center part, and the diameter gradually decreases from that position toward the first end 50L and the second end 50R. The position of the maximum diameter part 50M and the degree of gradually decreasing are not limited to this. The diameter from the second end 50R to the maximum diameter part 50M, i.e., the diameter at the second peripheral face 51R may be constant, and the diameter may gradually decrease at the first peripheral face 51L only. Alternatively, the platen roller 50 may have a maximum diameter at the second end 50R and the diameter may gradually decrease toward the first end 50L.

The embodiments as stated above describe an example where the elastic roller is used as a platen roller of a printer. This elastic roller may be used as other rollers such as a guide roller and a nip roller that have its separation property (non-stick property) and gripping property. In addition to them, this elastic roller may be used as an attaching (pressing) roller of an automatic attachment device of labels, and a guide roller, a deflecting roller and a driving roller of a printer, various coaters, and processing equipment of belt-shaped articles.

REFERENCE SIGNS LIST

1 linerless label
1A label piece of linerless label 1

2 label base
3 adhesive layer
4 thermosensitive color developing layer
5 separation agent layer
6 location detection mark
7 cutting line
8 thermal printer
9 feed part
10 part
11 detection part
12 print part
13 cutting part
14 guide roller
15 location detection sensor
16 thermal head
17 platen roller
18 fixed blade
19 movable blade
21 roller shaft
22 elastic member
23 inner layer side elastic member
24 coating layer
30, 40, 50 platen roller
31 internal groove
32 inner layer platform-shaped apex part
33 coating layer groove
34 coating layer platform-shaped apex part
50L first end
50M maximum diameter part
50R second end
51L first peripheral face
51R second peripheral face
T thickness of coating layer 24
P pitch of internal grooves 31
W width of internal grooves 31
H depth of internal grooves 31
G groove angle of internal grooves 31

The invention claimed is:

1. An elastic roller comprising:
a roller shaft; and
an elastic member attached around the roller shaft, the elastic roller configured to transfer a belt-shaped member while the belt-shaped member is in contact with the elastic member,
wherein
the elastic member includes:
an inner layer side elastic member disposed around the roller shaft; and
a coating layer disposed around the inner layer side elastic member, the coating layer for being in contact with the belt-shaped member,
the inner layer side elastic member having a rubber hardness of 30 to 80 degrees, the rubber hardness being measured by a durometer type A in accordance with the standard of JIS K 6253,
the inner layer side elastic member having a tear strength of 25 N/mm or more, the tear strength being measured using an unnicked angle-shaped test piece in accordance with JIS K 6252,
the coating layer being made of silicone resin, the coating layer having a thickness of 10 to 100 μm,
the silicone resin having a hardness of 20 degrees or less, the hardness being measured using a spring-based Asker C type in accordance with SRIS 0101 standard,
the inner layer side elastic member having a plurality of internal grooves along a circumferential direction,
each of the internal grooves having a width of 25 to 1,300 μm,
each of the internal grooves having a depth of 25 to 500 μm, and
each of the internal grooves having a V-shaped in cross section and having a groove angle of 50 to 120 degrees.

2. The elastic roller according to claim 1, wherein the silicone resin is a thermosetting silicone resin.

3. The elastic roller according to claim 2, wherein the inner layer side elastic member is made of a thermoplastic elastic material or a thermosetting elastic material.

4. The elastic roller according to claim 2, wherein the coating layer has a plurality of coating layer grooves along a circumferential direction.

5. The elastic roller according to claim 4, wherein the coating layer has a flat coating layer platform-shaped apex part between neighboring coating layer grooves.

6. The elastic roller according to claim 2, wherein the inner layer side elastic member has an inner layer platform-shaped apex part between neighboring internal grooves.

7. The elastic roller according to claim 2, wherein the internal grooves have a pitch of 500 to 1,500 μm.

8. The elastic roller according to claim 2, wherein the elastic roller has a constant diameter in a plane orthogonal to an axial direction of the roller shaft.

9. The elastic roller according to claim 2, wherein the elastic roller has a diameter in a plane orthogonal to an axial direction of the roller shaft, the diameter gradually decreasing from a center part of the roller shaft toward both ends of the roller shaft along the axial direction of the roller shaft.

10. The elastic roller according to claim 2, wherein the elastic roller has a diameter in a plane orthogonal to an axial direction of the roller shaft, the diameter of a first end of the roller shaft in the axial direction thereof being different from that of a second end of the roller shaft in the axial direction thereof.

11. The elastic roller according to claim 2, wherein the inner layer side elastic member has a tear strength of 27 to 45 N/mm.

12. The elastic roller according to claim 1, wherein the inner layer side elastic member is made of a thermoplastic elastic material or a thermosetting elastic material.

13. The elastic roller according to claim 1, wherein the coating layer has a plurality of coating layer grooves along a circumferential direction.

14. The elastic roller according to claim 13, wherein the coating layer has a flat coating layer platform-shaped apex part between neighboring coating layer grooves.

15. The elastic roller according to claim 1, wherein the inner layer side elastic member has an inner layer platform-shaped apex part between neighboring internal grooves.

16. The elastic roller according to claim 1, wherein the internal grooves have a pitch of 500 to 1,500 μm.

17. The elastic roller according to claim 1, wherein the elastic roller has a constant diameter in a plane orthogonal to an axial direction of the roller shaft.

18. The elastic roller according to claim 1, wherein the elastic roller has a diameter in a plane orthogonal to an axial direction of the roller shaft, the diameter gradually decreasing from a center part of the roller shaft toward both ends of the roller shaft along the axial direction of the roller shaft.

19. The elastic roller according to claim 1, wherein the elastic roller has a diameter in a plane orthogonal to an axial direction of the roller shaft, the diameter of a first end of the roller shaft in the axial direction thereof being different from that of a second end of the roller shaft in the axial direction thereof.

20. The elastic roller according to claim 1, wherein the inner layer side elastic member has a tear strength of 27 to 45 N/mm.

* * * * *